US012673404B2

(12) United States Patent
Li et al.

(10) Patent No.: US 12,673,404 B2
(45) Date of Patent: Jul. 7, 2026

(54) FASTENER DRIVER

(71) Applicant: Nanjing Chervon Industry Co., Ltd., Nanjing (CN)

(72) Inventors: Guang Li, Nanjing (CN); Jie Jiang, Nanjing (CN); Ran Lan, Nanjing (CN); Yuemei Min, Nanjing (CN); Yongkang Wu, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 19/303,593

(22) Filed: Aug. 19, 2025

(65) Prior Publication Data

US 2026/0077464 A1 Mar. 19, 2026

(30) Foreign Application Priority Data

Sep. 18, 2024 (CN) ......................... 202411302765.0
Jan. 17, 2025 (CN) ......................... 202510083280.5

(51) Int. Cl.
*B25C 1/06* (2006.01)
*B25C 1/04* (2006.01)

(52) U.S. Cl.
CPC ................ *B25C 1/06* (2013.01); *B25C 1/047* (2013.01)

(58) Field of Classification Search
CPC .................................. B25C 1/06; B25C 1/047
See application file for complete search history.

(56) References Cited

U.S. PATENT DOCUMENTS 3,243,093 A * 3/1966 Schaefer, Jr. ............. B25C 1/06 227/132
3,924,789 A * 12/1975 Avery ....................... B25C 1/06 227/132
4,384,622 A * 5/1983 Koziniak .................. B25C 1/06 173/205
12,059,786 B2 * 8/2024 Morimura ................. H02P 6/17
2003/0230256 A1 * 12/2003 Doherty .................... B25C 1/08 123/46 R
2019/0255690 A1 * 8/2019 Kondou .................. B25F 5/008
2025/0114927 A1 * 4/2025 Myers ....................... B25C 1/06
2025/0214214 A1 * 7/2025 Mokha ...................... B25C 1/06
2025/0269500 A1 * 8/2025 Mochizuki .............. B25B 21/00
2025/0317033 A1 * 10/2025 Friedman ............... H02K 11/30
2026/0070205 A1 * 3/2026 Wang ........................ B25C 1/06

FOREIGN PATENT DOCUMENTS

CN 110385675 A * 10/2019 ............... B25C 1/06
EP 3915731 B1 12/2021
WO WO-2023078010 A1 * 5/2023 ............... B25C 1/06

* cited by examiner

*Primary Examiner* — Lucas E. A. Palmer
(74) *Attorney, Agent, or Firm* — Greenberg Traurig, LLP

(57) ABSTRACT

A fastener driver includes a battery pack; a striking assembly including a striking member configured to strike a fastener; a drive assembly including at least a drive wheel configured to drive the striking member to move along a central axis of the striking member; an electric motor configured to drive the drive wheel to rotate; and a control circuit configured to control the electric motor to operate, start, or stop. A striking frequency of the striking member is greater than 6 fasteners/second.

20 Claims, 8 Drawing Sheets

FASTENER DRIVER

RELATED APPLICATION INFORMATION

This application claims the benefit under 35 U.S.C. § 119(a) of Chinese Patent Application No. CN 202411302765.0, filed on Sep. 18, 2024, and Chinese Patent Application No. CN 202510083280.5 filed on Jan. 17, 2024, which applications are incorporated herein by reference in their entireties.

BACKGROUND

A fastener driver refers to a device capable of driving a fastener (such as a nail, a pin, or a staple) into a workpiece. The fastener driver generally includes a striking member, and the striking member is driven to strike the fastener into the workpiece. The normal operation of the striking member ensures an operating state of the whole machine.

A conventional fastener driver generally includes a nail gun for quickly driving the nail into a working surface. The nail gun generally includes a pneumatic nail gun and an electric nail gun. With technical development, the pneumatic nail gun is gradually replaced with the electric nail gun. However, a maximum striking frequency of the electric nail gun is quite inferior to a maximum striking frequency of the pneumatic nail gun, and the user experience is to be improved.

SUMMARY

The present application adopts the technical solutions below.

A fastener driver includes a battery pack; a striking assembly including a striking member configured to strike a fastener; a drive assembly including at least a drive wheel configured to drive the striking member to move along a central axis of the striking member; an electric motor configured to drive the drive wheel to rotate; and a control circuit configured to control the electric motor to operate, start, or stop. A striking frequency of the striking member is greater than 6 fasteners/second.

In some examples, the control circuit includes a controller configured to control rotation of the electric motor in a field weakening control manner.

In some examples, the controller is configured to adjust a conduction angle of stator windings during operation of the electric motor to be greater than 120°and less than 180°.

In some examples, the controller is configured to, in response to a shutdown signal, control the electric motor to stop according to the number of revolutions, a rotational speed, or an operating time of the electric motor such that the striking assembly stops substantially at a top dead point of a striking cycle after shutdown.

In some examples, the controller is configured to, when detecting a startup signal within a current striking cycle, control the electric motor to operate continuously at a maximum rotational speed to at least when the fastener is struck within a next striking cycle.

In some examples, the electric motor has a maximum rotational speed ≤30000 rpm.

A fastener driver includes a battery pack; a striking assembly including a striking member configured to strike a fastener; a drive assembly including at least a drive wheel configured to drive the striking member to move along a central axis of the striking member; an electric motor configured to drive the drive wheel to rotate; and a control circuit configured to control the electric motor to operate, start, or stop. A first performance ratio PR1 of the fastener driver is defined as PR1=D/T, where D denotes the distance between the center of the drive wheel to the central axis of the striking member, T denotes a striking frequency of the striking member, and PR1≤3.

In some examples, the striking frequency of the striking member is ≥7 fasteners/second.

In some examples, the striking frequency of the striking member is ≥8 fasteners/second.

In some examples, the striking member moves from a bottom dead point to a top dead point for a time ≤160 ms.

In some examples, the striking member moves from a bottom dead point to a top dead point at a speed ≥0.3 mm/s.

In some examples, the electric motor has a speed ratio ≤60.

In some examples, the electric motor has rotational inertia ≤3.5 $kg\cdot m^2$.

In some examples, the electric motor has an average angular acceleration >(12000π) $rad/s^2$ from the beginning of startup to a maximum rotational speed.

In some examples, a second performance ratio PR2 of the fastener driver is defined as PR2=L/T, where L denotes a one-way stroke of the striking member within one striking cycle, and PR2≤9.

In some examples, the electric motor has a diameter ≤40 mm.

In some examples, the electric motor has a length-to-diameter ratio ≥0.5.

In some examples, the electric motor has rated power ≤400 W.

In some examples, the fastener driver is a pre-inflated electric nail gun, and the pre-inflated electric nail gun in a non-operating state has air pressure ≤1 MPa at a top dead point and air pressure ≤0.5 MPa at a bottom dead point.

A fastener driver includes a battery pack; a striking assembly including a striking member configured to strike a fastener; a drive assembly including at least a drive wheel configured to drive the striking member to move along a central axis of the striking member; an electric motor configured to drive the drive wheel to rotate; and a control circuit configured to control the electric motor to operate, start, or stop. A third performance ratio PR3 of the fastener driver is defined as PR3=i×L/Vmax, where i denotes a speed ratio of the electric motor, L denotes a one-way stroke of the striking member within one striking cycle, Vmax denotes a maximum rotational speed of the electric motor, and PR3≤0.1.

A fastener driver includes a striking assembly including a striking member configured to strike a fastener; a drive assembly including at least a drive wheel configured to drive the striking member to move along a central axis of the striking member; an electric motor configured to output a driving force to drive the drive wheel; a main switch configured to be triggered in response to an intention to drive the striking assembly; and a controller capable of controlling the electric motor to operate in response to a control signal from the triggered main switch. The controller is configured to, in the case where the main switch remains triggered, control the electric motor to continuously operate to drive the striking assembly to strike fasteners at a preset striking frequency, where the preset striking frequency is greater than or equal to 6 fasteners/second.

In some examples, the striking member is configured to, within one striking cycle, move from a shutdown position to a firing position to strike the fastener into a workpiece surface and return from the firing position to the shutdown position.

In some examples, the controller is configured to, during continuous operation of the electric motor, when detecting that the striking member returns and the distance from a shutdown position is less than a preset distance, control the electric motor to rotate at a maximum rotational speed.

In some examples, the controller is configured to, during continuous operation of the electric motor, control the electric motor to operate at a maximum rotational speed.

In some examples, the maximum rotational speed of the electric motor is less than or equal to 30000 rpm.

In some examples, the controller is configured to, when detecting that a rotation parameter of the electric motor during continuous operation is greater than or equal to a first parameter threshold, control the electric motor to exit a rotational state of continuously operating.

In some examples, the controller is configured to, when detecting that a striking parameter of the striking assembly that is striking the fasteners at the preset frequency is greater than or equal to a second parameter threshold, control the electric motor to exit a rotational state of continuously operating.

A fastener driver includes a striking assembly including a striking member configured to strike a fastener; a drive assembly including at least a drive wheel configured to drive the striking member to move along a central axis of the striking member; an electric motor configured to output a driving force to drive the drive wheel; a main switch configured to be operated and triggered in response to an intention to drive the striking assembly; and a controller capable of controlling the electric motor to operate in response to a control signal from the triggered main switch. The controller is configured to, in the case where the main switch remains triggered, control the electric motor to continuously operate at a maximum rotational speed greater than or equal to 15000 rpm to drive the striking assembly to strike fasteners at a preset striking frequency.

In some examples, the striking member is configured to, within one striking cycle, move from a shutdown position to a firing position to strike the fastener into a workpiece surface and return from the firing position to the shutdown position.

In some examples, the maximum rotational speed of the electric motor is less than or equal to 30000 rpm.

In some examples, the controller is configured to, when detecting that a rotation parameter of the electric motor during continuous operation is greater than or equal to a first parameter threshold, control the electric motor to exit a rotational state of continuously operating.

In some examples, the controller is configured to, when detecting that a striking parameter of the striking assembly that is striking the fasteners at the preset frequency is greater than or equal to a second parameter threshold, control the electric motor to exit a rotational state of continuously operating.

DETAILED DESCRIPTION

Figure 1:
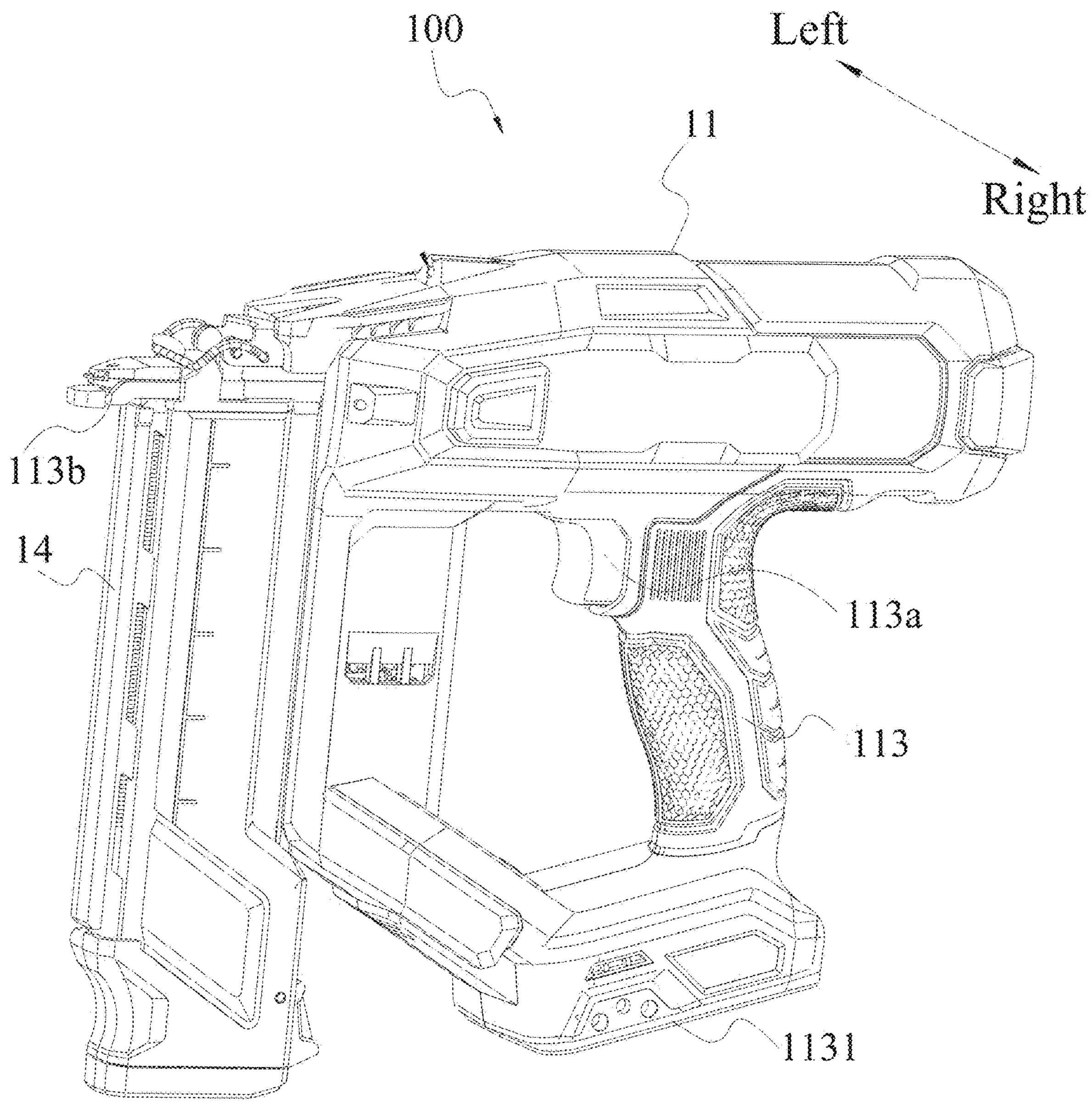
FIG. 1 is a perspective view of a fastener driver.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character “/” in this application generally indicates that the contextual associated objects belong to an “and/or”relationship.

In this application, the terms “connection”, “combination”, “coupling” and “installation” may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, “connection” and “coupling” are not limited to physical or mechanical connections or couplings, and may include electrical connections or couplings.

In this application, it is to be understood by those skilled in the art that a relative term (such as “about”, “approximately”, and “substantially”) used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, “substantially” when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

As for the definitions of up, down, left, right, front, and rear in the present application, reference may be made to the orientations shown in FIGS. 1 to 4.

FIG. 1 shows a fastener driver 100 according to an example of the present application. The fastener driver 100 is used for driving a fastener into a working surface. For example, the fastener is a nail, and the nail may be a straight nail or a U-shaped nail. The fastener driver 100 quickly drives the fastener into the working surface, thereby fixing the working surface to a platform on the back of the working surface.

Figure 2:
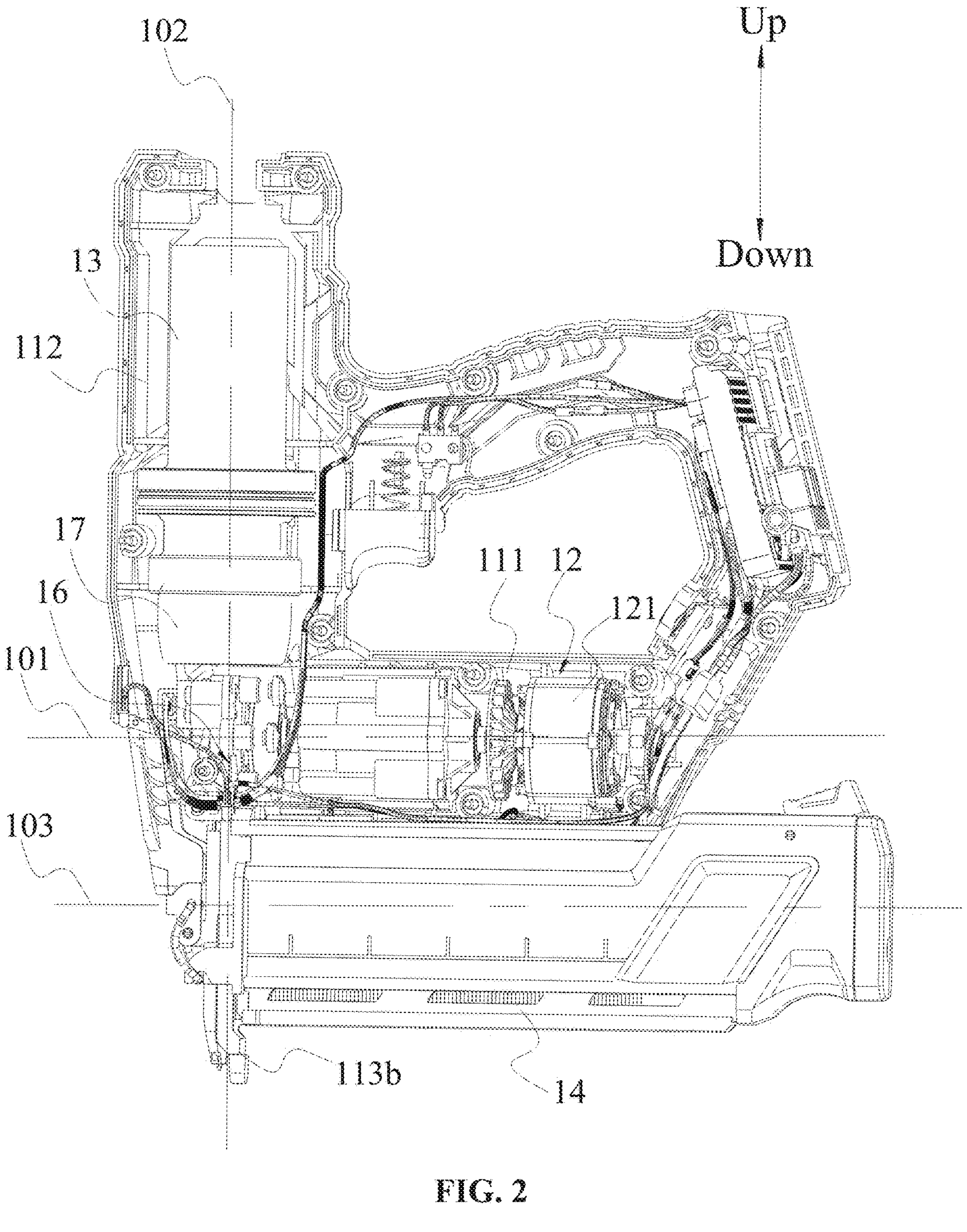
FIG. 2 is a sectional view of the fastener driver of FIG. 1.
Figure 3:
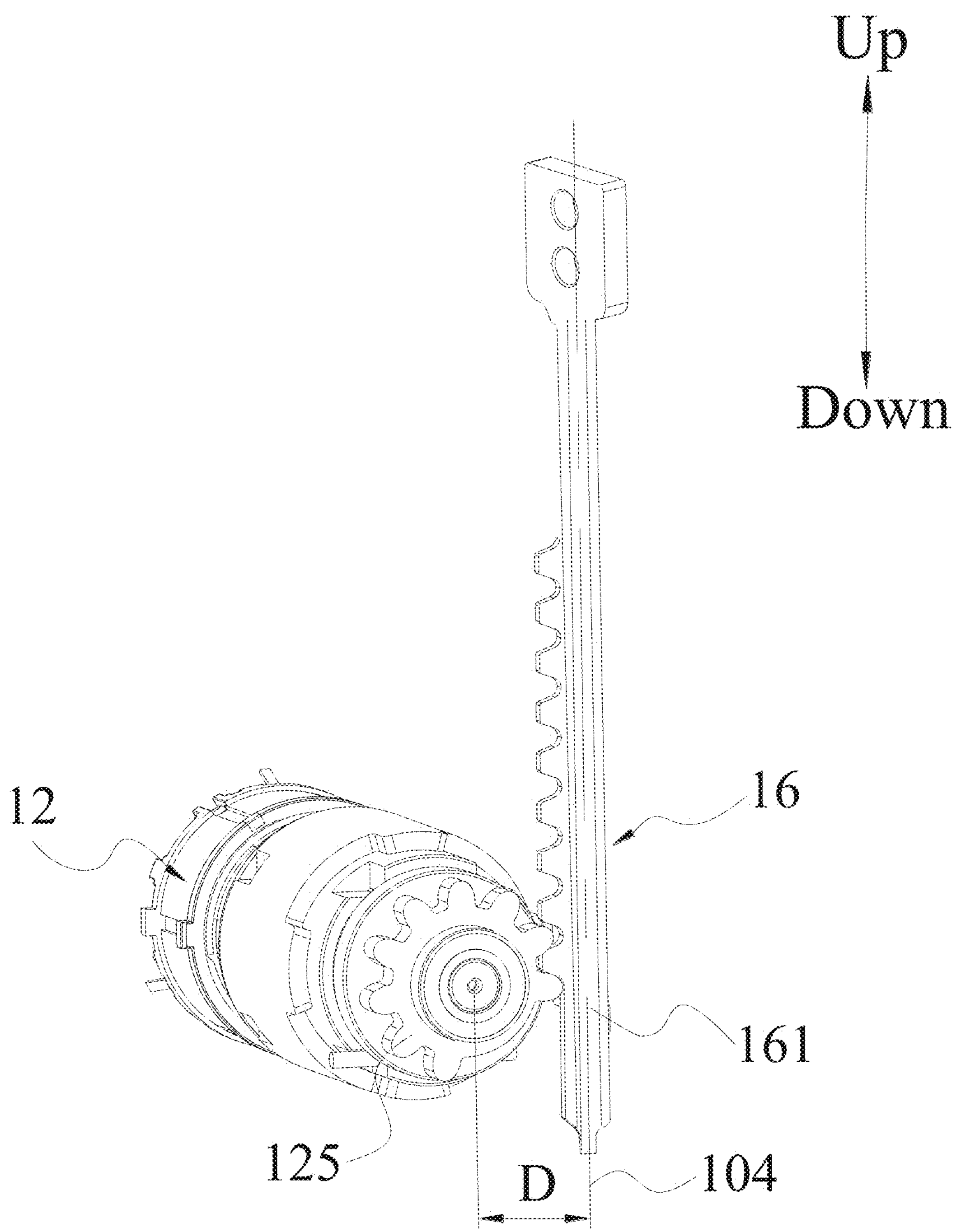
FIG. 3 is a schematic view of internal structures of the fastener driver of FIG. 1 at an initial position.

As shown in FIGS. 1 to 3, the fastener driver 100 includes a housing 11, a drive assembly 12, a striking assembly 16, and a motor 121, where the housing 11 is configured to support the drive assembly 12, the striking assembly 16, and the motor 121, and the striking assembly 16 is configured to drive the fastener to be shot into the working surface along a direction of a striking straight line 102. The drive assembly 12 is configured to drive the striking assembly 16 to move along the direction of the striking straight line 102, thereby impacting and shooting the fastener into the working surface along the direction of the striking straight line 102.

The motor 121 is disposed in the housing 11 and configured to power the drive assembly 12. In this example, the motor 121 is specifically an electric motor 121, and the electric motor 121 powers the drive assembly 12. It is to be understood that in other examples, the motor 121 may be another form of power source, such as an engine. In the present application, for ease of description, the electric motor 121 is used for description. In some examples, the electric motor 121 is an inrunner. It is to be understood that in other examples, the electric motor 121 may be an outrunner.

A speed ratio of the electric motor 121 refers to the ratio of a rotational speed of an output shaft of the electric motor 121 to a rotational speed of an input shaft. The speed ratio of the electric motor reflects the efficiency of the electric motor 121 during deceleration or acceleration. In some examples, the speed ratio of the electric motor 121 is ≤60. In some examples, the speed ratio of the electric motor 121 is ≤50. In some examples, the speed ratio of the electric motor 121 is ≤45. In some examples, the speed ratio of the electric motor 121 is ≤40. The speed ratio of the electric motor 121 is limited within the above range so that the electric motor 121 has relatively high efficiency during deceleration or acceleration.

The diameter of the electric motor 121 refers to the diameter of a rotor or an outer edge of the rotor of the electric motor 121. The diameter of the electric motor 121 is one of the important factors affecting the performance of the electric motor 121. In some examples, the diameter of the electric motor 121 is ≤40 mm. In some examples, the diameter of the electric motor 121 is ≤35 mm. In some examples, the diameter of the electric motor 121 is ≤30 mm. A length-to-diameter ratio of the electric motor 121 refers to the ratio of an axial length of the electric motor 121 to the diameter of the electric motor 121. In some examples, the length-to-diameter ratio of the electric motor 121 is ≥0.5. The diameter and length-to-diameter ratio of the electric motor 121 are limited within the above ranges so that the electric motor 121 has relatively good performance.

The rotational inertia of the electric motor 121 is a measure of the inertia of the electric motor 121 during rotation about an axis. A magnitude of the rotational inertia of the electric motor 121 has a direct effect on the starting and braking performance of the electric motor 121. In some examples, the rotational inertia of the electric motor 121 is ≤3.5 $kg \cdot m^2$. Thus, the electric motor 121 has relatively good starting and braking performance.

The rated power of the electric motor 121 is an important parameter for measuring the performance of the electric motor 121 and represents maximum power that the electric motor 121 can output within a certain time. The higher the rated power of the electric motor 121, the better the performance of the electric motor 121 and the greater load the electric motor 121 can drive. However, too high rated power may lead to problems such as an energy waste and device overheating. In some examples, the rated power of the electric motor 121 is ≤400 W. Thus, the electric motor 121 is less likely to cause problems such as the energy waste and the device overheating while having relatively good performance.

In some examples, the electric motor 121 has an average angular acceleration >(12000π) $rad/s^2$ from the beginning of startup to a maximum rotational speed. In this example, a maximum angular velocity is 2π×300 rad/s. Since a product of the average angular acceleration and an acceleration time is the maximum angular velocity, the electric motor 121 has an average angular acceleration >(12000π) $rad/s^2$ from the beginning of startup to the maximum rotational speed so that the acceleration time is less than (2π×300)/(12000π)=0.05 s. A relatively short acceleration time of the electric motor 121 not only improves the power output efficiency and response speed of the electric motor 121 but also optimizes the continuity and smoothness of power transmission.

The housing 11 includes a first accommodation space 111 extending along a direction of a first straight line 101 and a second accommodation space 112 extending along a direction of the striking straight line 102. In an example, the drive assembly 12 may be partially disposed in the first accommodation space 111 or partially disposed in the second accommodation space 112. In an example, the drive assembly 12 may include the electric motor 121 or an energy storage device. The energy storage device may be understood as one that releases stored kinetic energy within the first half of a striking cycle to achieve striking and stores energy within the second half of the striking cycle to prepare for the next strike. The energy storage device may be a cylinder 13 capable of pre-storing gas, a cylinder 13 inflatable and deflatable during operation, or an elastic member such as a spring. In this example, the cylinder 13 serves as the energy storage device and is disposed in the second accommodation space 112.

The striking assembly 16 is disposed in the cylinder 13, and gas in the cylinder 13 does work to push the striking assembly 16 to move, thereby driving out the fastener. The fastener driver 100 further includes a striking portion 17. The striking portion 17 is at least partially disposed in the cylinder 13 and may be, for example, a piston disposed in the cylinder 13 and connected to the striking assembly 16. The striking portion 17 may be connected to the striking assembly 16 and can strike the striking assembly 16 so that the striking assembly 16 moves within the cylinder 13. In an example, the cylinder 13 further includes an inflation nozzle configured to pre-fill gas into the cylinder 13. The pre-filled gas in a compressed state stores a relatively large amount of kinetic energy and can push the striking portion 17 to quickly strike the striking assembly 16 so that the striking assembly 16 drives out the fastener. Alternatively, the cylinder 13 may include an air intake nozzle and an air exhaust nozzle so that the cylinder 13 does not need to be pre-filled with gas and can be inflated during operation of the fastener driver 100.

Figure 4:
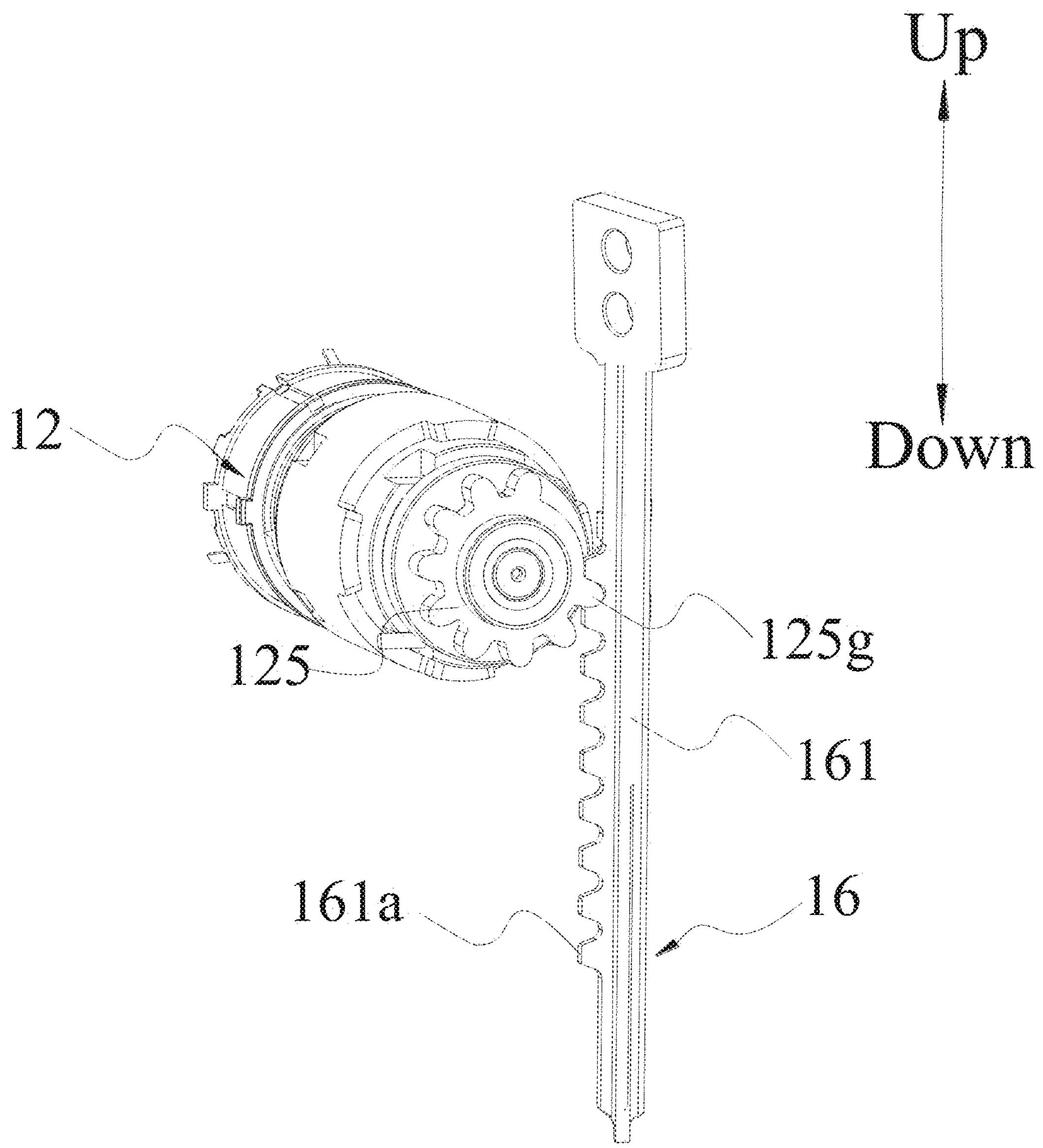
FIG. 4 is a schematic view of internal structures of the fastener driver of FIG. 1 at a firing position.

The cylinder 13 that can be pre-filled with gas is used as an example here. As shown in FIGS. 2 to 4, after the fastener driver 100 shuts down, the electric motor 121 stops outputting power and can make the striking assembly 16 stop at an initial position. The pre-filled gas in the cylinder 13 is in the compressed state. After the fastener driver 100 is powered on and the electric motor 121 is started, the electric motor 121 outputs power, the striking assembly 16 is released, and the striking portion 17 can convert the kinetic energy of the cylinder 13 into a striking force for striking the striking assembly 16 so that the striking assembly 16 obtains instantaneously a relatively large acceleration, moves to a firing position shown in FIG. 4, and drives the fastener. After the fastener is driven out, the striking assembly 16 is driven by the electric motor 121 to return from the firing position shown in FIG. 4 to the initial position shown in FIG. 3 and shuts down, during which the striking assembly 16 can continuously drive the striking portion 17 to compress the gas in the cylinder 13. A process from the startup of the fastener driver to when the striking assembly 16 returns to the initial position or the proximity of the initial position, that is, a shutdown position after striking is referred to as the striking cycle.

It is to be noted that the initial position shown in FIG. 3 is a position at which the striking assembly 16 stops after the fastener driver 100 shuts down and may also be referred to as the shutdown position. A position to which the striking assembly 16 can move upward farthest may be referred to as a top dead point, and a position to which the striking assembly 16 can move downward farthest is referred to as a bottom dead point. The firing position and the bottom dead point may be the same position, while the initial position approaches the top dead point from bottom to top but is not the top dead point, that is to say, the distance between the initial position and the top dead point is greater than 0.

In some examples, the fastener driver 100 may include a mechanical spring-type nail gun that utilizes a force of a compressed coil spring as an impact force (for example, the striking force). In some examples, the fastener driver 100 is a cylinder-type nail gun in which the gas in the cylinder 13 is compressed to push the fastener out. In some examples, the fastener driver 100 is a pre-inflated electric nail gun. In this case, the fastener driver 100 does not require an external air compressor, and the cylinder 13 is pre-filled with pressurized gas. For example, the cylinder 13 of the fastener driver 100 communicates with the atmosphere, and in a pre-inflated state, the gas flows into the cylinder 13. When the fastener driver 100 is the pre-inflated electric nail gun, the pre-inflated electric nail gun in a non-operating state has air pressure ≤1 MPa at the top dead point and air pressure ≤0.5 MPa at the bottom dead point.

As shown in FIGS. 2 and 3, the electric motor 121 extends basically along the direction of the first straight line 101, and the cylinder 13 and the striking assembly 16 disposed in the cylinder 13 extend basically along the direction of the striking straight line 102. The electric motor 121 and the cylinder 13 are substantially perpendicular to each other. The electric motor 121 may serve as a power source and is configured to drive the drive assembly 12 to drive the striking assembly 16 to move within the cylinder 13. In an optional implementation, the drive assembly 12 includes a drive shaft and a drive wheel 125, the drive wheel 125 is disposed on the drive shaft, the electric motor 121 may be part of the drive assembly 12 to output power to the drive shaft and drive the drive wheel 125 to rotate, and the rotating drive wheel 125 drives the striking assembly 16 to move along the direction of the striking straight line 102.

The striking assembly 16 includes at least a striking member 161 configured to strike the fastener, the striking member 161 is a sheet-like element extending along a plane parallel to the direction of the striking straight line 102, and a central axis 104 defined by the striking member 161 coincides with the striking straight line 102. In some examples, the striking member 161 moves from the bottom dead point to the top dead point for a time ≤160 ms. In some examples, the striking member 161 moves from the bottom dead point to the top dead point at a speed ≥0.3 mm/s.

In an example, the striking assembly 16 may further include the striking portion 17, and the striking portion 17 may be the piston connected to the top of the striking member 161. The piston is fixedly or detachably connected to the striking member 161. The striking portion 17 can compress the pre-filled gas in the cylinder 13 in the process of the striking member 161 being driven to move upward, that is, towards the initial position. As shown in FIGS. 2 to 4, the striking member 161 is formed with transmission teeth **161*a*, and the striking member 161 can move within the cylinder 13 along the direction of the striking straight line 102, where the striking straight line 102 may be understood as a striking direction, that is, a direction in which the fastener is shot. The drive wheel 125 can mate with the transmission teeth 161*a* to drive the striking member 161 to do work against air pressure in the cylinder 13 so that the striking member 161 can move to the initial position shown in FIG. 3**.

Figure 5:
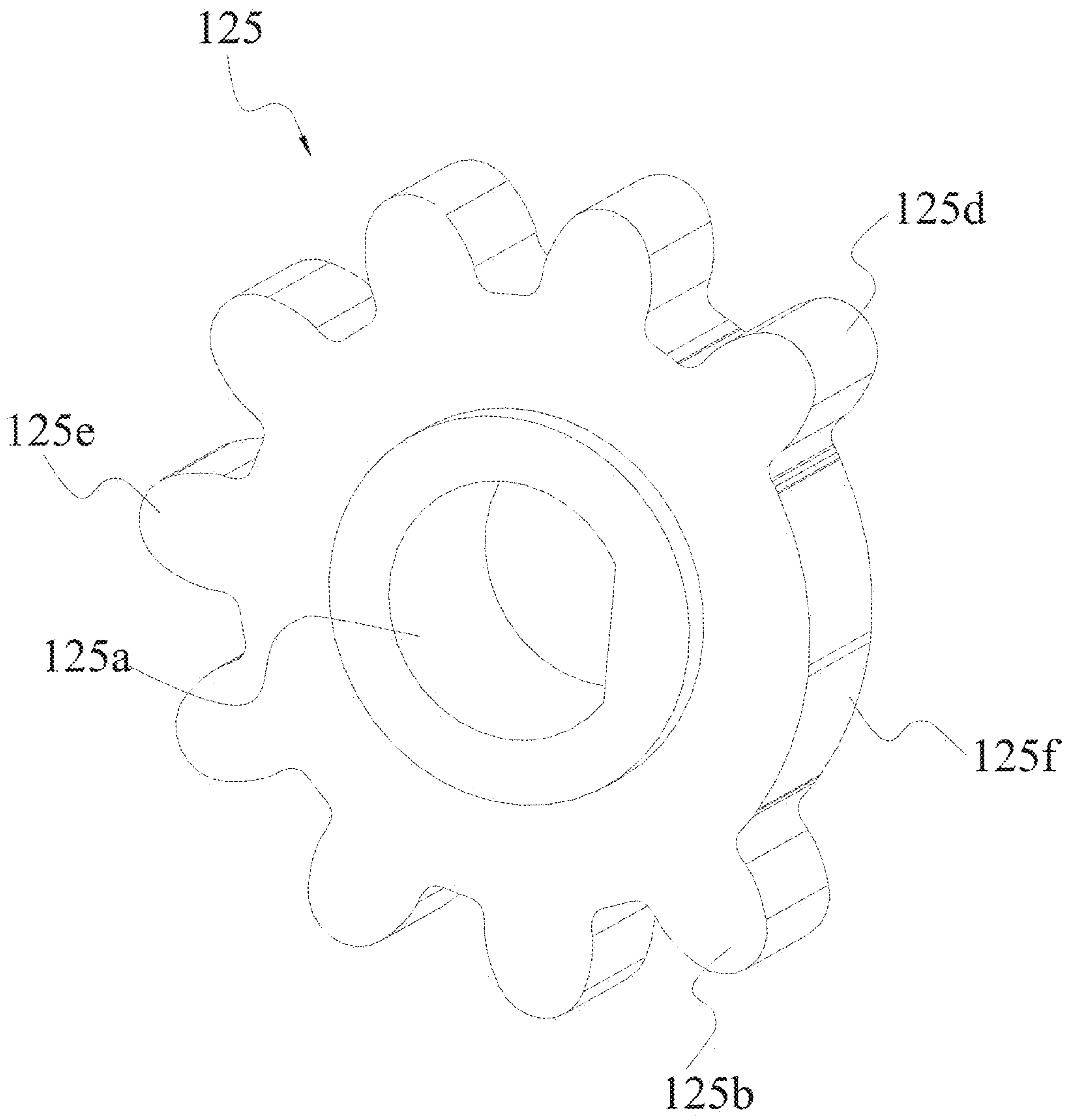
FIG. 5 is a perspective view of a drive wheel of the fastener driver of FIG. 1.

As shown in FIGS. 4 and 5, the drive wheel 125 is a gear structure. Multiple drive teeth 125*g* are formed around a body portion of the drive wheel 125, and the drive teeth 125*g* include a first tooth 125*b* at a starting end and a second tooth 125*d* at a tail end. Here, a drive tooth 125*g* that first contacts the striking member 161 of the striking assembly 16 when the drive wheel 125 starts driving the striking assembly 16 to reset to the initial position shown in FIG. 3 is defined as the first tooth 125*b*, and a drive tooth 125*g* that last meshes with the striking member 161 of the striking assembly 16 when the striking assembly 16 is already at the initial position is defined as the second tooth 125*d*. A first section 125*e* and a second section 125*f* are included between the first tooth 125*b* and the second tooth 125*d*. The multiple drive teeth 125*g* are evenly distributed on the first section 125*e*; and the second section 125*f* is smooth and continuous without any drive teeth 125*g*. When the drive teeth 125*g* on the first section 125*e* mesh with the transmission teeth 161*a* on the striking member 161, the drive wheel 125 can drive the striking member 161 to compress the gas in the cylinder 13 and do work. When the second section 125*f* mates with the striking member 161, since the second section 125*f* is smooth and continuous, the striking member 161 is not stopped by the drive teeth 125*g* and is rapidly pushed out by the gas in the cylinder 13, achieving the striking effect. In other examples, the drive wheel 125 may be another form of drive component, and other possible structural forms of the drive wheel 125 are not specifically limited in the present application.

As shown in FIGS. 1 and 2, the fastener driver 100 further includes a magazine assembly 14 disposed at the front end of the housing 11, and the magazine assembly 14 is disposed in a direction of a second straight line 103 parallel to the first straight line 101. The magazine assembly 14 is configured to accommodate the fastener, and the striking member 161 moves to strike the fastener within the magazine assembly 14.

Figure 6:
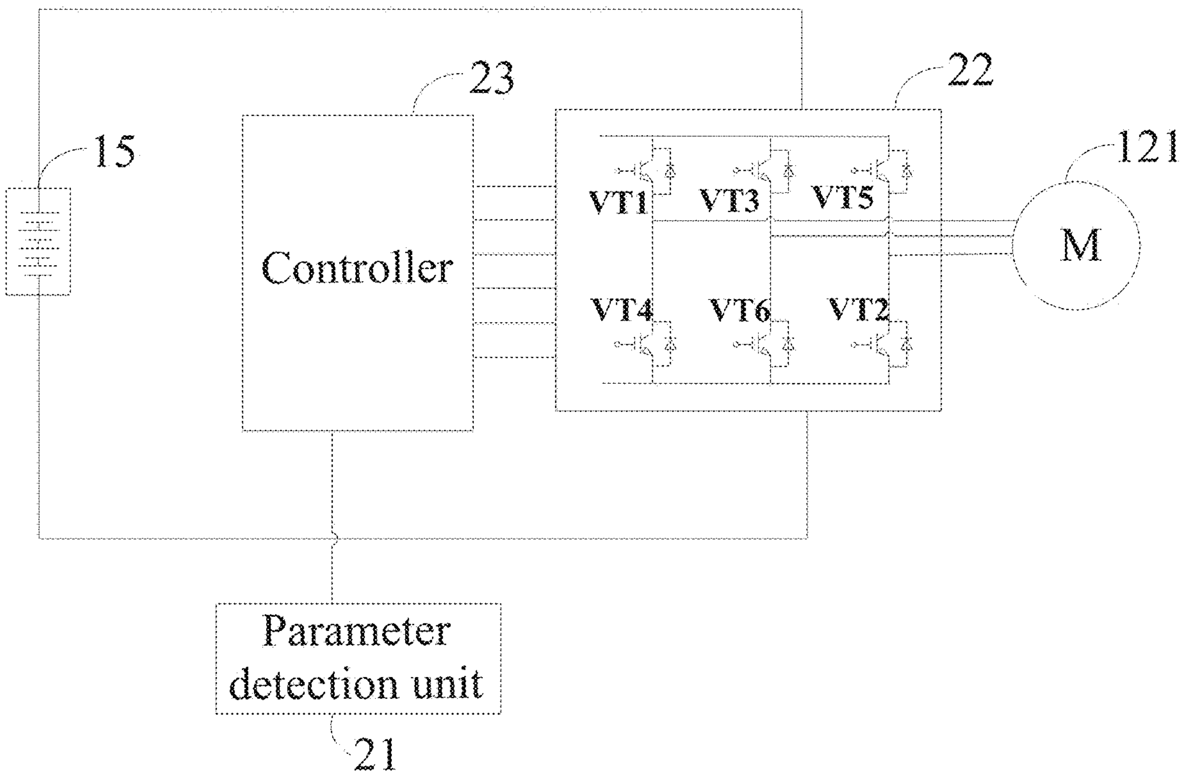
FIG. 6 is a circuit schematic of a fastener driver according to an example.

As shown in FIGS. 1 and 6, the fastener driver 100 uses a rechargeable battery set as a power supply. In this example, the battery set is a battery pack 15, and the battery pack 15 supplies power to the fastener driver 100 in collaboration with a corresponding power supply circuit. It is to be understood by those skilled in the art that in other examples, the fastener driver 100 may be powered by other power supply devices. For example, the power supply may be an alternating current wire connected to mains electricity or another connection cable that can be connected to power supply equipment. The corresponding components in the fastener driver 100 are powered through the mains electricity or another power supply equipment in collaboration with corresponding rectifier, filter, and voltage regulator circuits. The battery pack 15 is used below instead of the power supply, which is not to limit the present application.

In this example, the battery pack 15 is detachably mounted to the housing 11. When being mounted to the housing 11, the battery pack 15 can supply power to at least the electric motor 121 to enable the electric motor 121 to operate. Specifically, the housing 11 is further formed with a handle portion 113 for a user to hold. A power interface 1131 is provided at an end of the handle portion 113 and configured to connect a direct current or alternating current power supply. In this example, the power interface 1131 is configured to connect the battery pack 15.

As shown in FIGS. 1 and 6, the fastener driver 100 includes a control circuit 200 configured to control the electric motor 121 to operate or stop. The control circuit 200 may include at least a parameter detection unit 21, a driver circuit 22, and a controller 23. As a power supply for the control circuit 200, the battery pack 15 can not only provide electrical energy for driving the electric motor 121 but also provide a low-voltage power supply for the controller 23 after conversion by a power conversion unit or provide electrical energy for the parameter detection unit 21. This example illustrates only a power supply path for the battery pack 15 to provide electrical energy for the electric motor 121 and omits a detailed description of other possible power supply paths.

In an example, the driver circuit 22 is connected between the controller 23 and the electric motor 121 and may receive control signals output from the controller 23 and change its own conduction state, so as to control an operating state of the electric motor 121, including, for example, stop, rotation, a rotational speed, or a direction of rotation. Optionally, the driver circuit 22 may consist of one or more power elements. In an example, as shown in FIG. 6, the driver circuit 22 includes multiple power elements VT1, VT2, VT3, VT4, VT5, and VT6. A gate terminal of each power element is electrically connected to the controller 23 and configured to receive a control signal from the controller 23. A drain or source of each power element is connected to a stator winding of the electric motor 121. The power elements VT1 to VT6 receive the control signals from the controller 23 to change their respective on states, thereby changing a current loaded to stator windings of the electric motor 121 by the battery pack 15. In an example, the driver circuit 22 may be a three-phase bridge driver circuit including six controllable semiconductor power devices (such as field-effect transistors (FETs), bipolar junction transistors (BJTs), or insulated-gate bipolar transistors (IGBTs)). It is to be understood that the power elements may be any other types of solid-state switches, such as IGBTs or BJTs.

To make the electric motor 121 rotate, the driver circuit 22 has multiple driving states. In one driving state, the stator windings of the electric motor 121 generate a magnetic field, and the controller 23 outputs corresponding pulse-width modulation (PWM) control signals to switching elements in the driver circuit 22 according to a rotor position or a back electromotive force of the electric motor 121 so that the driving state of the driver circuit 22 is switched and thus the stator windings generate a changing magnetic field to drive the rotor to rotate, thereby achieving the rotation or commutation of the electric motor 121. It is to be noted that any other circuits and control manners that can drive the rotation or commutation of the electric motor 121 can be applied to the present disclosure and the circuit structure of the driver circuit 22 and the control of the driver circuit 22 by the controller 23 are not limited in the present disclosure.

The parameter detection unit 21 can detect at least an operating parameter of the electric motor 121 or an electrical parameter of the battery pack 15. In an example, the parameter detection unit 21 may detect an output current, an output voltage, or output power of the electric motor 121, an operating time of the electric motor 121 within the striking cycle (that is, a time of the striking cycle), a striking frequency, the number of revolutions of the electric motor within the striking cycle, or the like. In an example, the parameter detection unit 21 may also detect a battery parameter of the battery pack 15, such as an output voltage, a current, energy consumption, or power consumption of the battery pack 15 within the striking cycle. It is to be understood that the parameter detection unit 21 may include one or more detection devices that can detect various different operating parameters or battery parameters separately or simultaneously.

To provide the user with better striking experience, in this example, a striking frequency of the striking member 161 is greater than 6 fasteners/second, where the striking frequency of the striking member 161 refers to the number of fasteners that the striking member 161 can strike in a unit time. Preferably, the striking frequency of the striking member 161 is greater than or equal to 7 fasteners/second. Preferably, the striking frequency of the striking member 161 is greater than or equal to 8 fasteners/second. The striking frequency of the striking member 161 is increased so that the fastener driver 100 has a relatively high striking frequency, and the user has relatively good striking experience.

In some examples, as shown in FIGS. 2 and 3, a first performance ratio PR1 of the fastener driver 100 is defined as PR1=D/T, where D denotes the distance between the center of the drive wheel 125 to the central axis 104 of the striking member 161, T denotes the striking frequency of the striking member 161, and PR1≤3. In some examples, PR1≤2.7. The first performance ratio PR1 of the fastener driver 100 is within the above range so that the fastener driver 100 has a relatively high striking frequency, and the user has relatively good striking experience. It should be noted that D should be expressed in millimeter, and T should be expressed in No. of fasteners/second. As one strike fastens one fastener, a number of fasteners per second is also a number of strikes per second.

In some examples, a second performance ratio PR2 of the fastener driver 100 is defined as PR2=L/T, where L denotes a one-way stroke of the striking member 161 within one striking cycle, and PR2≤9. In some examples, PR2≤8.7. The second performance ratio PR2 of the fastener driver 100 is within the above range so that the fastener driver 100 has a relatively high striking frequency, and the user has relatively good striking experience. It should be noted that L should be expressed in millimeter, and T should be expressed in No. of fasteners/second. As one strike fastens one fastener, a number of fasteners per second is also a number of strikes per second.

A third performance ratio PR3 of the fastener driver 100 is defined as PR3=i×L/Vmax, where i denotes the speed ratio of the electric motor 121, L denotes a one-way stroke of the striking member 161 within one striking cycle, Vmax denotes the maximum rotational speed of the electric motor 121, and PR3≤0.1. In some examples, PR3≤0.08. In some examples, PR3≤0.075. In some examples, PR3≤0.07. The third performance ratio PR3 of the fastener driver 100 is within the above range so that the fastener driver 100 has a relatively high striking frequency, and the user has relatively good striking experience. It should be noted that L should be expressed in millimeter, and T should be expressed in No. of fasteners/second. As one strike fastens one fastener, a number of fasteners per second is also a number of strikes per second.

To increase the striking frequency, in some examples, the controller 23 is configured to control the rotation of the electric motor 121 in a field weakening control manner. Field weakening control is a control technique for increasing the rotational speed of the electric motor 121 by reducing a magnetic field intensity of the electric motor 121. Optionally, the controller 23 is configured to increase a lead angle of the electric motor 121 or expand a conduction angle of the electric motor 121, and no matter whether the lead angle of the electric motor 121 is increased or the conduction angle of the electric motor 121 is expanded, the field weakening control can be achieved. Since the rotational speed of the electric motor 121 is positively correlated to the striking frequency, the rotational speed of the electric motor 121 is increased so that the striking frequency can be effectively increased.

In some examples, the controller 23 is configured to adjust the conduction angle of the stator windings during operation of the electric motor 121 to be greater than 120° and less than 180°. The stator windings are a circuit part of the electric motor 121, and a three-phase alternating current is introduced into the stator windings to generate a rotating magnetic field. The conduction angle of the stator windings is a phase difference of current conduction in the stator windings and directly affects the formation and intensity of the rotating magnetic field. Therefore, a magnitude of the conduction angle of the stator windings determines a rotational speed and a direction of the rotating magnetic field and affects the rotational speed and the direction of rotation of the electric motor 121. The controller 23 is configured to adjust the conduction angle of the stator windings during operation of the electric motor 121 to be greater than 120° and less than 180° so that the rotational speed of the electric motor 121 can be effectively increased, thereby increasing the striking frequency.

It is known that the striking member 161 stops at the shutdown position after the striking cycle of the fastener driver 100 ends. In order that it takes a relatively short time for the striking member 161 to strike the fastener, in this example, the shutdown position of the striking assembly 16 is close to the top dead point. To make the shutdown position of the striking assembly 16 close to the top dead point, the controller 23 is configured to, in response to a shutdown signal, control the electric motor 121 to stop according to the number of revolutions, the rotational speed, or an operating time of the electric motor 121 such that the striking assembly 16 stops substantially at the top dead point of the striking cycle after shutdown.

Specifically, since the operating time of the electric motor 121 is associated with the shutdown position, the controller 23 may trigger the shutdown signal according to the operating time of the electric motor 121 after power-on, and the controller 23 may control, in response to the shutdown signal, the electric motor 121 to stop rotating. For example, the striking cycle is T, and the controller 23 may trigger the shutdown signal after the electric motor 121 rotates for a time T1 and control the electric motor to stop so that the striking assembly 16 stops substantially at the top dead point of the striking cycle after shutdown.

Since a correspondence relationship between the number of revolutions of the electric motor 121 and a position of the striking member 161 is not affected by the rotational speed of the electric motor 121 or other factors, in some examples, the controller 23 may control the shutdown position of the striking member 161 according to the number of revolutions of the electric motor 121. In an example, referring to the control circuit shown in FIG. 6, the parameter detection unit 21 may also detect the number of revolutions of the electric motor 121. For example, the parameter detection unit 21 may start counting from 0 after the electric motor 121 is started and calculate the number of revolutions of the electric motor 121 according to the number of commutations of the electric motor 121. Before detecting the shutdown signal, the controller 23 may control, in advance, the electric motor 121 to operate at a constant speed, so as to ensure that the rotational speed is stable when the electric motor 121 brakes. A stable or constant initial brake speed can ensure that the number of revolutions of the electric motor 121 from the start of braking to the stop of rotation is stable, thereby ensuring that the striking member 161 can stably stop at the shutdown position. That is, the striking assembly 16 can stop substantially at the top dead point of the striking cycle after shutdown.

Since the rotational speed of the electric motor 121 determines a movement distance of the striking assembly 16 per unit time, the rotational speed of the electric motor 121 may be adjusted and the electric motor 121 may be controlled to stop according to the shutdown position and an actual position of the striking assembly 16 so that the striking assembly 16 stops substantially at the top dead point of the striking cycle after shutdown.

For an upward striking requirement, when the fastener is driven into the working surface, a large amount of dust may be generated and fall down. At this time, if an operating state of the fastener driver 100 is in a process of lifting from the bottom dead point to the top dead point, dust may be sucked into the cylinder, affecting the subsequent striking quality. To solve the above problem, the parameter detection unit 21 further includes an attitude detection member configured to detect a striking direction of the striking assembly 16, where the striking direction is a movement direction of the fastener when the fastener is struck. The controller 23 is configured to, when the attitude detection member detects that the striking direction of the striking assembly 16 is upward, control the electric motor 121 to stop such that the striking assembly 16 stops substantially at the bottom dead point of the striking cycle after shutdown and when the attitude detection member detects that the striking direction of the striking assembly 16 is not upward, control the electric motor 121 to stop such that the striking assembly 16 stops substantially at the top dead point of the striking cycle after shutdown. The shutdown at the bottom dead point during upward striking and the shutdown at the top dead point during striking in other directions can effectively prevent dust from being sucked into the cylinder and affecting the striking quality, avoiding an effect on the service life of the fastener driver 100 under special operating conditions.

In some examples, the attitude detection member includes a gyroscope which may be disposed on an outer wall of the housing 11. It is to be understood that in other examples, the attitude detection member may be another sensor that can detect the striking direction, which is not specifically limited here and only illustrated.

In other examples, the parameter detection unit 21 further includes a distance detection member configured to detect distance information of the fastener driver 100. The controller 23 is configured to, when the attitude detection member detects that the striking direction of the striking assembly 16 is upward, control the electric motor 121 to stop after the fastener is struck by the striking assembly 16, acquire the distance information detected by the distance detection member, and when the distance information is greater than a preset distance, control the electric motor 21 to start so that the striking assembly 16 stops substantially at the top dead point of the striking cycle after the electric motor 121 stops. In some examples, the distance detection member includes a distance sensor and may be disposed on the outer wall of the housing 11. It is to be understood that in other examples, the distance sensor may be another sensor that can detect the distance, such as a laser sensor, an ultrasonic sensor, or an infrared sensor, which is not specifically limited here and only illustrated. After the upward striking is completed, the electric motor 121 is controlled to stop, and after it is identified that the fastener driver 100 has moved a certain distance, the electric motor 121 is started and stopped for the shutdown at the top dead point so that the dust can be effectively prevented from being sucked into the cylinder and affecting the striking quality, avoiding an effect on the service life of the fastener driver 100 under special operating conditions.

With continued reference to the fastener driver 100 shown in FIGS. 1 and 2, the handle portion 113 is provided with a main switch 113*a*, and the user controls the start and stop of the fastener driver 100 through the main switch 113*a*. In some examples, the main switch 113*a* is configured to be triggered in response to an intention to drive the striking assembly 16, and the controller 23 is capable of controlling the electric motor 121 to operate in response to a control signal from the triggered main switch 113*a*, where the control signal is an electrical signal generated by the main switch 113*a* when triggered. In some examples, the main switch 113*a* is electrically connected to the controller 23 so that when triggered, the main switch 113*a* can send the control signal to the controller 23. The fastener driver 100 further includes a push rod switch 113*b*. The push rod switch 113*b* may serve as a safety switch and is disposed at the lower end of the striking assembly 16. When the user pushes the fastener driver 100 downward along the striking direction, that is, the direction of the striking straight line 102, the push rod switch 113*b* can abut against the working surface. Thus, the push rod switch 113*b* is turned on, that is, the push rod switch 113*b* is triggered.

Generally, the fastener driver 100 can include at least two working modes: a single drive mode and a continual drive mode. In the single drive mode, one fastener can be driven each time. In the continual drive mode, multiple fasteners are driven continually. In an example, the main switch 113*a* and the push rod switch 113*b* are triggered in different manners corresponding to different working modes of the fastener driver 100. For example, in the case where the push rod switch 113*b* abuts against the working surface, the main switch 113*a* is operated so that the single drive mode of the fastener driver 100 can be initiated to drive one fastener. When the main switch 113*a* is operated and the push rod switch 113*b* abuts against the working surface, the continual drive mode of the fastener driver 100 can be initiated. In the continual drive mode, the main switch 113*a* is continuously operated, and the user only needs to intermittently press the push rod switch 113*b* against the working surface so that the fasteners can be driven continually. That is to say, in the case where the main switch 113*a* is always triggered by the user, one fastener is driven every time the push rod switch 113*b* abuts against the working surface. That is to say, continual striking does not mean continuous striking but that in the case where the main switch 113*a* is continuously triggered, one fastener is driven every time the push rod switch 113*b* is turned on. Generally, when a relatively heavy workload is required or when the working surface has good continuity or planarity and needs to be fastened at multiple positions, the user may perform the continual striking in the continual drive mode to improve the operating efficiency.

However, the continual drive mode has certain drawbacks. In the related art, in the continual drive mode, the rotational speed of the electric motor 121 is reduced to zero at the end of the striking cycle, and the rotational speed of the electric motor 121 is controlled to gradually increase from zero after the next striking cycle starts. To improve the efficiency of continual striking, in some examples, the controller 23 is configured to, when detecting a startup signal within the current striking cycle, control the electric motor 121 to operate continuously at the maximum rotational speed to at least when the fastener is struck within the next striking cycle. It is to be understood that the user may generally operate the main switch 113*a* or the push rod switch 113*b* again after the second half of the current striking cycle starts to generate the startup signal. That is to say, the controller 23 may acquire the startup signal when the striking assembly 16 returns upward from the firing position to the initial position after striking the fastener. For example, after detecting the startup signal within the second half of the current striking cycle, the controller 23 may control the electric motor 121 to operate continuously at the maximum rotational speed to continue driving the striking assembly 16 to return to the initial position and then quickly move from the initial position to the firing position to complete a strike. In some examples, the maximum rotational speed of the electric motor 121 is ≤30000 rpm. Before the end of the current striking cycle, in response to the startup signal for the next striking cycle, the electric motor 121 is controlled to operate continuously at the maximum rotational speed so that a time for which the rotational speed of the electric motor 121 decreases to zero and increases again from zero between two consecutive striking cycles is saved, thereby improving the efficiency of continual striking and effectively increasing the striking frequency.

Figure 7:
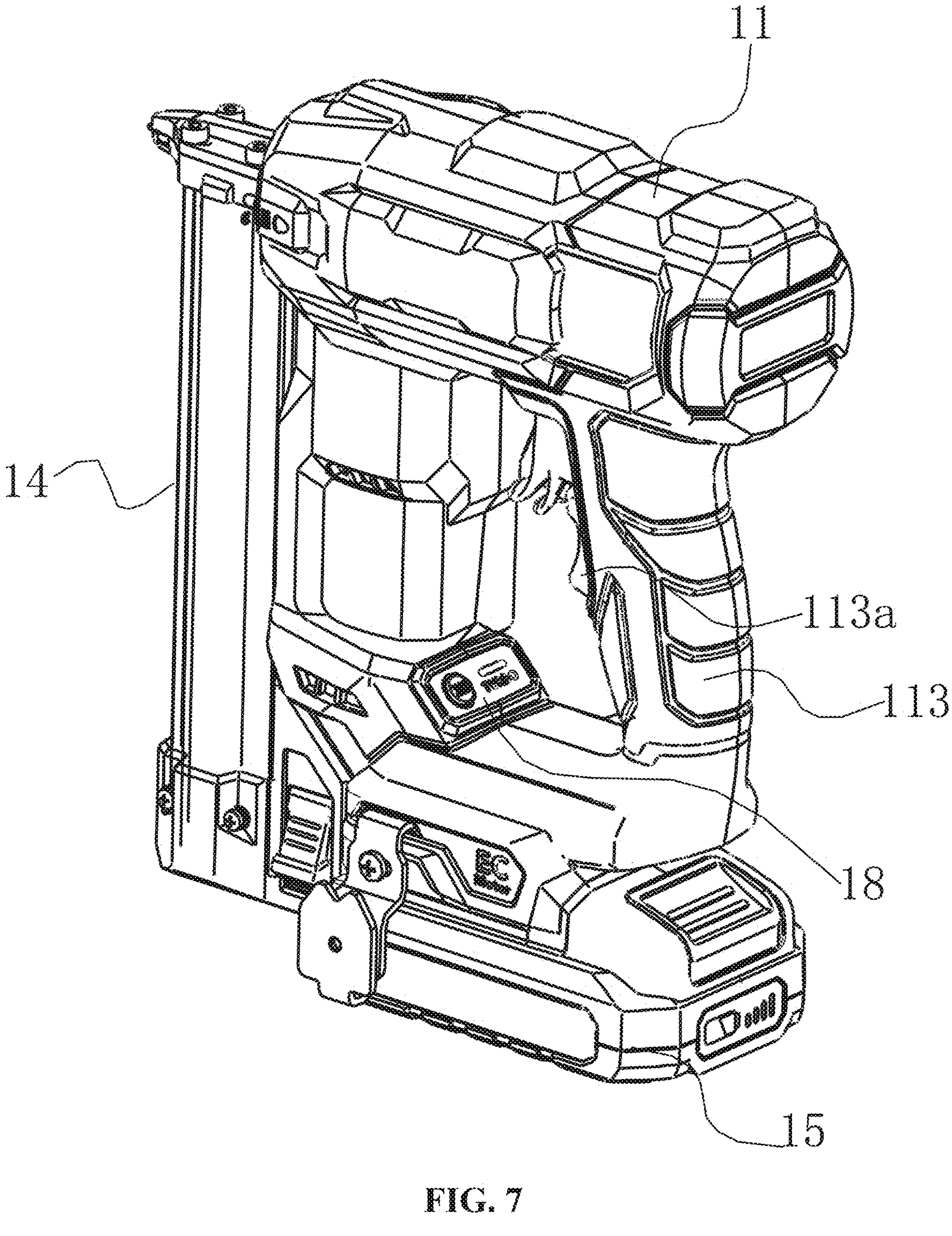
FIG. 7 is a perspective view of a fastener driver according to an example.
Figure 8:
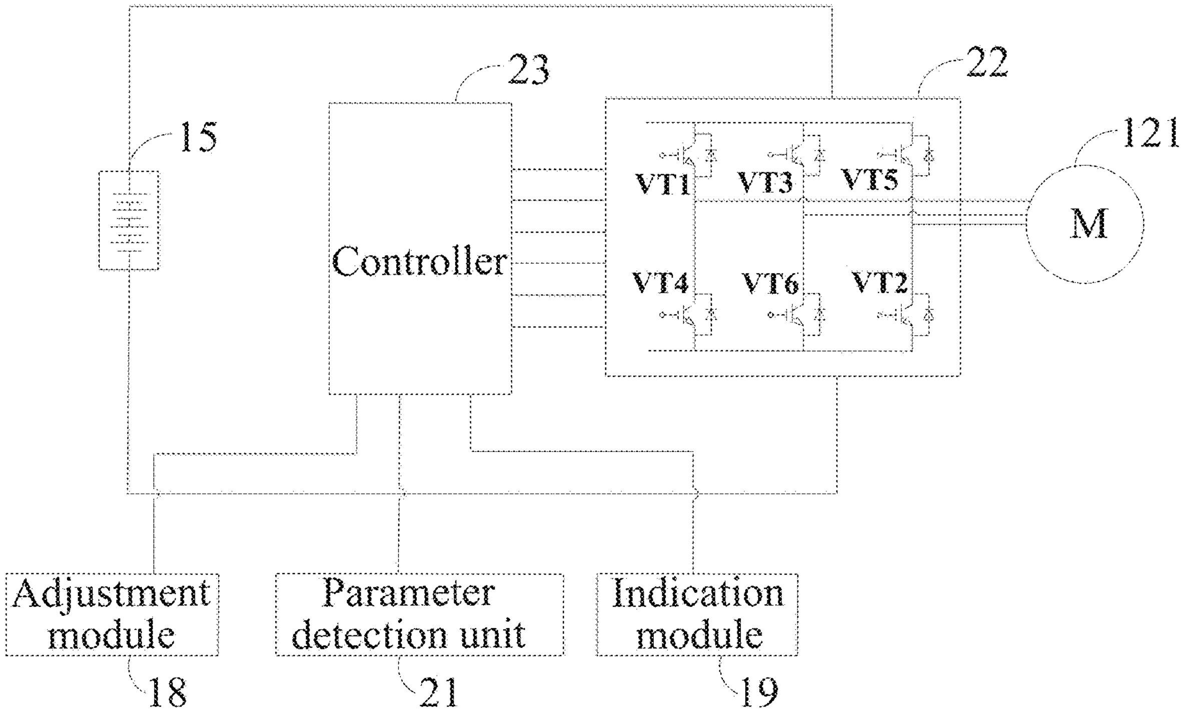
FIG. 8 is a circuit schematic of the fastener driver of FIG. 7.

In some examples, as shown in FIGS. 7 and 8, the fastener driver 100 does not include the push rod switch 113*b*, and the fastener driver 100 includes at least a turbo mode and a single strike mode. In the turbo mode, when the user keeps the main switch 113*a* triggered, the fastener driver 100 continually strikes fasteners at a preset striking frequency. That is, in the case where the main switch 113*a* remains triggered, the controller 23 controls the electric motor 121 to continuously operate to drive the striking assembly 16 to strike the fasteners at the preset striking frequency. In the single strike mode, one fastener is struck each time the user triggers the main switch 113*a*.

To increase the striking frequency of the fastener driver 100, the controller 23 is configured to, in the case where the main switch 113*a* remains triggered, control the electric motor 121 to continuously operate to drive the striking assembly 16 to strike the fasteners at the preset striking frequency, where the preset striking frequency is ≥6 fasteners/second. That is, the user controls the striking assembly 16 to continually strike the fasteners at the preset striking frequency by keeping the main switch 113*a* triggered. Since the preset striking frequency is ≥6 fasteners/second, the striking member 161 can fire at least six fasteners within 1 s, thereby achieving a relatively high striking frequency and providing the user with relatively good striking experience.

In some examples, as shown in FIGS. 7 and 8, the controller 23 is configured to, during continuous operation of the electric motor 121, when detecting that the striking member 161 returns and the distance from the shutdown position is less than a preset distance, control the electric motor 121 to rotate at the maximum rotational speed. The electric motor 121 operates at the maximum rotational speed so that the striking member 161 can move at a relatively fast speed, which is beneficial for increasing the striking frequency. In some examples, the controller 23 is configured to, during continuous operation of the electric motor 121, control the electric motor 121 to operate at the maximum rotational speed. That is, during the continual striking of the fasteners, the electric motor 121 has a relatively high rotational speed and effectively enables the striking assembly 16 to strike the fasteners at a relatively fast speed so that the striking assembly 16 can be controlled to continually strike the fasteners at the preset striking frequency, thereby achieving a relatively high striking frequency.

In some examples, the controller 23 is configured to, in the case where the main switch 113*a* remains triggered, control the electric motor 121 to continuously operate at the maximum rotational speed ≥15000 rpm to drive the striking assembly 16 to continually strike the fasteners at the preset striking frequency, thereby achieving a relatively high striking frequency and providing the user with relatively good striking experience. In some examples, the maximum rotational speed of the electric motor 121 is ≤30000 rpm.

In some examples, the controller 23 is configured to, when detecting that a rotation parameter of the electric motor 121 during continuous operation is greater than or equal to a first parameter threshold, control the electric motor 121 to exit a rotational state of continuously operating. The rotation parameter refers to a parameter related to the rotation of the electric motor 121. In some examples, the rotation parameter includes one or more of the output power of the electric motor 121, the rotational speed of the electric motor 121, output torque of the electric motor 121, an input current of the electric motor 121, or the temperature of the electric motor 121. The first parameter threshold is set. When one or more rotation parameters of the electric motor 121 exceed the first parameter threshold, the electric motor 121 is controlled to exit the rotational state of continuously operating, that is, exit the turbo mode so that the electric motor 121 can be protected from damage, the system stability can be improved, and the service life of the electric motor 121 can be prolonged.

In some examples, as shown in FIGS. 7 and 8, the controller 23 is configured to, when detecting that a striking parameter of the striking assembly 16 that is striking the fasteners at the preset striking frequency is greater than or equal to a second parameter threshold, control the electric motor 121 to exit the rotational state of continuously operating. The striking parameter refers to a parameter related to the striking of the fasteners. In some examples, the striking parameter includes one or more of a striking quantity, the striking frequency, or the striking temperature. The striking quantity refers to the number of fasteners struck, the striking frequency refers to the number of fasteners struck per unit time, and the striking temperature refers to a temperature during striking of the fastener driver 100. In some examples, the striking temperature includes one or more of the temperature of the cylinder or the temperature of a bumper pad. The second parameter threshold refers to a critical value that the striking parameter does not exceed to avoid the effect on the service life of the fastener driver 100. When the striking frequency is relatively high, the temperature of the bumper pad, the cylinder 13, or the like of the fastener driver 100 is relatively high, affecting the service life of the fastener driver 100. When the striking parameter for the fasteners is greater than or equal to the second parameter threshold, the electric motor 121 is controlled to exit the rotational state of continuously operating, that is, exit the turbo mode so that the service life of the fastener driver 100 can be prevented from being affected by high-speed striking.

In some examples, the fastener driver 100 includes an adjustment module 18, and the adjustment module 18 is operated to drive the fastener driver 100 to enter the turbo mode or the single strike mode. As shown in FIG. 7, the adjustment module 18 may be disposed at a position of the housing 11 close to the circumferential side of the electric motor, on an inner side of the handle portion 113, at the upper end of the battery pack 15, or at any other position convenient for the user to observe and operate. In some examples, the adjustment module 18 includes a panel switch. When the panel switch is short-pressed, the fastener driver enters the single strike mode. When the panel switch is long-pressed, the fastener driver enters the turbo mode. It is to be understood that the adjustment module 18 may be operated in other manners so that the fastener driver enters or exits the turbo mode, which are not exhaustively listed here. In some examples, to prevent accidental entry into the turbo mode, the adjustment module 18 further includes an auxiliary button. When the panel switch is long-pressed and the auxiliary button is also pressed, the fastener driver enters the turbo mode. In some examples, the adjustment module 18 includes a selection switch. When the selection switch is at a first position, the fastener driver 100 enters the single strike mode. When the selection switch is at a second position, the fastener driver 100 enters the turbo mode. The specific structure of the adjustment module 18 is not limited here and is only illustrated.

To help the user know the current mode of the fastener driver 100, in some examples, the fastener driver 100 further includes an indication module 19. When the fastener driver 100 is in the single strike mode, the indication module 19 emits first indication information. When the fastener driver 100 is in the turbo mode, the indication module 19 emits second indication information. In some examples, the indication module 19 may be disposed in the same region or on the same operation panel as the adjustment module 18. In some examples, the indication module 19 may be disposed separately from the adjustment module 18. In some examples, the adjustment module 18 may be integrated with the function of the indication module 19 or may serve as the indication module 19. In some examples, the indication module 19 includes an indicator light, where the first indication information is an always on indicator light, and the second indication information is a flashing indicator light. In some examples, two indicator lights are provided, and the two indicator lights emit light of different colors, which are a first color and a second color, respectively. The first indication information is light of the first color emitted by one indicator light, and the second indication information is light of the second color emitted by the other indicator light. The specific structure of the indication module 19 is not limited here and is only illustrated.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. A fastener driver, comprising:

a battery pack;

a striking assembly comprising a striking member configured to strike a fastener;

a drive assembly comprising at least a drive wheel configured to drive the striking member to move along a central axis of the striking member;

an electric motor configured to drive the drive wheel to rotate; and a control circuit configured to control the electric motor to operate, start, or stop;

wherein a first performance ratio PR1 of the fastener driver is defined as PR1=D/T, D denotes a distance between a center of the drive wheel to the central axis of the striking member with a unit of millimeter, T denotes a striking frequency of the striking member with a unit of fastener/second, and PR1≤3.

2. The fastener driver of claim 1, further comprising a main switch configured to be triggered to drive the striking assembly, wherein the control circuit comprises a controller capable of controlling the electric motor to operate in response to a control signal from the triggered main switch, and the controller is configured to, when the main switch remains triggered, control the electric motor to continuously operate to drive the striking assembly to strike fasteners at the striking frequency T.

3. The fastener driver of claim 2, wherein the controller is configured to, during continuous operation of the electric motor, when detecting that the striking member returns and a distance from a shutdown position is less than a preset distance, control the electric motor to rotate at a maximum rotational speed.

4. The fastener driver of claim 2, wherein the controller is configured to, when detecting that a rotation parameter of the electric motor during continuous operation is greater than or equal to a first parameter threshold, control the electric motor to exit a rotational state of continuously operating.

5. The fastener driver of claim 2, wherein the controller is configured to, when detecting that a striking parameter of the striking assembly that is striking fasteners at a preset frequency is greater than or equal to a second parameter threshold, control the electric motor to exit a rotational state of continuously operating.

6. The fastener driver of claim 1, wherein the striking member moves from a bottom dead point to a top dead point for a time shorter than or equal to 160 ms.

7. The fastener driver of claim 1, wherein the striking member moves from a bottom dead point to a top dead point at a speed larger than or equal to 0.3 mm/s.

8. The fastener driver of claim 1, wherein the electric motor has a speed ratio smaller than or equal to 60.

9. The fastener driver of claim 1, wherein the electric motor has rotational inertia smaller than or equal to 3.5 $kg \cdot m^2$.

10. The fastener driver of claim 1, wherein the electric motor has an average angular acceleration >(12000π) $rad/s^2$ from the beginning of startup to a maximum rotational speed.

11. The fastener driver of claim 1, wherein a second performance ratio PR2 of the fastener driver is defined as PR2 =L/T, wherein L denotes a one-way stroke of the striking member within one striking cycle with a unit of millimeter, and PR2≤9.

12. The fastener driver of claim 1, wherein the electric motor has a diameter smaller than or equal to 40 mm.

13. The fastener driver of claim 1, wherein a rated power of the electric motor is smaller or equal to 400 W.

14. The fastener driver of claim 1, wherein the fastener driver is a pre-inflated electric nail gun, air pressure of the pre-inflated electric nail gun in a non-operating state is smaller than or equal to 1 MPa at a top dead point, and air pressure of the pre-inflated electric nail gun in a non-operating state is smaller than or equal to 0.5 MPa at a bottom dead point.

15. A fastener driver, comprising:

a battery pack;

a striking assembly comprising a striking member configured to strike a fastener;

a drive assembly comprising at least a drive wheel configured to drive the striking member to move along a central axis of the striking member;

an electric motor configured to drive the drive wheel to rotate; and a control circuit configured to control the electric motor to operate, start, or stop;

wherein a performance ratio PR3 of the fastener driver is defined as PR3=i×L/Vmax, i denotes a speed ratio of the electric motor, L denotes a one-way stroke of the striking member within one striking cycle with a unit of millimeter, Vmax denotes a maximum rotational speed of the electric motor with a unit of rpm, Vmax is less than or equal to 30000 rpm, and PR3≤0.1.

16. A fastener driver, comprising:

a battery pack;

a striking assembly comprising a striking member configured to strike a fastener;

a drive assembly comprising at least a drive wheel configured to drive the striking member to move along a central axis of the striking member;

an energy storage device configured to release stored kinetic energy within a first half of a striking cycle to implement striking and store energy within a second half of the striking cycle to prepare for a next strike, the energy storage device comprises a cylinder capable of pre-storing gas, a cylinder inflatable and deflatable during operation, or an elastic member;

an electric motor configured to drive the drive wheel to rotate; and a control circuit configured to control the electric motor to operate, start, or stop;

wherein a striking frequency of the striking member is greater than 6 fasteners/second.

17. The fastener driver of claim 16, further comprising a main switch configured to be operated and triggered to drive the striking assembly, wherein the control circuit comprises a controller configured to, when the main switch remains triggered, control the electric motor to continuously operate at a maximum rotational speed greater than or equal to 15000 rpm to drive the striking assembly to strike fasteners at a preset striking frequency.

18. The fastener driver of claim 16, wherein the control circuit comprises a controller configured to control rotation of the electric motor in a field weakening control manner.

19. The fastener driver of claim 18, wherein the controller is configured to adjust a conduction angle of stator windings during operation of the electric motor to be greater than 120°and less than 180°.

20. The fastener driver of claim 16, wherein a maximum rotational speed of the electric motor is smaller than or equal to 30000 rpm.

* * * * *